(12) United States Patent
Choi et al.

(10) Patent No.: US 11,430,081 B2
(45) Date of Patent: Aug. 30, 2022

(54) ELECTRONIC DEVICE FOR PROCESSING IMAGE TOGETHER WITH EXTERNAL ELECTRONIC DEVICE AND OPERATION METHOD THEREOF

(71) Applicant: Samsung Electronics Co., Ltd., Suwon-si (KR)

(72) Inventors: Jongbum Choi, Suwon-si (KR); Sungoh Kim, Suwon-si (KR); Youngjo Kim, Suwon-si (KR); Hyunhee Park, Suwon-si (KR); Arang Lee, Suwon-si (KR); Hyungju Chun, Suwon-si (KR); Changsu Han, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 16/981,103

(22) PCT Filed: Mar. 25, 2019

(86) PCT No.: PCT/KR2019/003431
§ 371 (c)(1),
(2) Date: Sep. 15, 2020

(87) PCT Pub. No.: WO2019/182424
PCT Pub. Date: Sep. 26, 2019

(65) Prior Publication Data
US 2021/0019858 A1 Jan. 21, 2021

(30) Foreign Application Priority Data
Mar. 23, 2018 (KR) .......................... 10-2018-0033709

(51) Int. Cl.
*G06T 1/20* (2006.01)
*G06T 5/50* (2006.01)
*G06V 10/94* (2022.01)

(52) U.S. Cl.
CPC .................. *G06T 1/20* (2013.01); *G06T 5/50* (2013.01); *G06V 10/955* (2022.01)

(58) Field of Classification Search
CPC ............ G06T 1/20; G06T 5/50; G06V 10/955
(Continued)

(56) References Cited

U.S. PATENT DOCUMENTS

2005/0251578 A1  11/2005  Kraslavsky
2006/0002726 A1   1/2006  Fukui
(Continued)

FOREIGN PATENT DOCUMENTS

JP  2000-347977 A  12/2000
JP  2006-050578 A   2/2006
(Continued)

OTHER PUBLICATIONS

Chen Wu, "Real-Time Human Posture Reconstruction in Wireless Smart Camera Networks", Information Processing in Sensor Networks, International Conference On, IEEE, Piscataway, NJ, USA, Apr. 22, 2008, pp. 321-331, XP058248596.
(Continued)

*Primary Examiner* — Gabriel I Garcia
(74) *Attorney, Agent, or Firm* — Jefferson IP Law, LLP

(57) ABSTRACT

An electronic device is disclosed. An electronic device according to various embodiments may comprise a memory, a communication module, and a processor, wherein the processor is configured to: identify a raw image; on the raw image, perform image processing according to a designated first image signal processing set; transmit the raw image, for which the image processing according to the designated first
(Continued)

image signal processing set has at least partially been performed, to an external electronic device by using the communication module during the image processing; and transmit information corresponding to the at least partial processing to the external electronic device so as to allow the external electronic device to omit, by using the raw image, for which the image processing has at least partially been performed, processing corresponding to the at least partial processing among a designated second image signal processing set included in the external electronic device. Various other embodiments may be provided.

14 Claims, 9 Drawing Sheets

(58) Field of Classification Search
USPC .......................................................... 382/307
See application file for complete search history.

(56) References Cited

U.S. PATENT DOCUMENTS

| 2006/0215045 | A1* | 9/2006 | Ooishi | H04N 5/365 |
| | | | | 348/241 |
| 2011/0011179 | A1 | 1/2011 | Gustafsson et al. | |
| 2013/0174042 | A1 | 7/2013 | Kim et al. | |
| 2014/0139690 | A1 | 5/2014 | Tanaka et al. | |
| 2014/0307800 | A1* | 10/2014 | Sole Rojals | H04N 19/176 |
| | | | | 375/240.18 |
| 2018/0336666 | A1 | 11/2018 | Kim et al. | |
| 2019/0110077 | A1 | 4/2019 | Kim et al. | |
| 2021/0067690 | A1* | 3/2021 | Im | H04N 5/23229 |

FOREIGN PATENT DOCUMENTS

| JP | 2014-102691 A | 6/2014 |
| KR | 10-2013-0079116 A | 7/2013 |
| KR | 10-1303415 B1 | 9/2013 |
| KR | 10-2018-0127782 A | 11/2018 |
| KR | 10-2019-0040416 A | 4/2019 |

OTHER PUBLICATIONS

Liu Hong et al., "A novel approach to task assignment in a cooperative multi-agent design system", Applied Intelligence, vol. 43, No. 1, Jan. 18, 2015, pp. 162-175, XP55782865.

Ting Liu et al., "IMPALA: a Middleware System for Managing Autonomic, Parallel Sensor Systems", Proceedings of the ACM SIGPLAN Symposium on Principles and Practice of Parallel Programming. San Diego, CA, Jun. 11-13, 2003, Jun. 11, 2003, pp. 107-118, XP001198443.

Christophe Bobda et al., "Reconfigurable architectures for distributed smart cameras", Distributed Embedded Smart Cameras,, May 1, 2014, pp. 43-68, XP009525945.

Athanassios Boulis et al., "SensorWare: Programming sensor networks beyond code update and querying", Pervasive and Mobile Computing, Elsevier, NL, vol. 3, No. 4, Jun. 14, 2007, pp. 386-412, XP022117388.

European Search report dated Mar. 17, 2021, issued in European Application No. 19771801.8-1210.

* cited by examiner

| DEVICE INFORMATION | DEVICE MODEL, IMAGE PROCESSING SET VERSION, ISP IMAGE PROCESSING MODULE VERSION, IMAGE PROCESSING MODULE VERSION, LENS CHARACTERISTIC INFORMATION, SENSOR MODEL | | | | | |
|---|---|---|---|---|---|---|
| PROCESSING STATE | IMAGE PROCESSING TYPE | IMAGE PROCESSING 1 | IMAGE PROCESSING 2 | IMAGE PROCESSING 3 | IMAGE PROCESSING 4 | IMAGE PROCESSING 5 | IMAGE PROCESSING 6 |
| | WHETHER TO PERFORM | 1 | 1 | 1 | 0 | 0 | 0 |

FIG.6

ELECTRONIC DEVICE FOR PROCESSING IMAGE TOGETHER WITH EXTERNAL ELECTRONIC DEVICE AND OPERATION METHOD THEREOF

CROSS-REFERENCE TO RELATED APPLICATION(S)

This application is a National Phase Entry of PCT International Application No. PCT/KR2019/003431, which was filed on Mar. 25, 2019 and claims priority to Korean Patent Application No. 10-2018-0033709, which was filed on Mar. 23, 2018 in the Korean Intellectual Property Office, the contents of which are incorporated herein by reference.

BACKGROUND

1. Field

Various embodiments relate to an electronic device for processing an image and an operation method thereof.

2. Description of the Related Art

Image processing of a general image signal processor (ISP) is performed in a single device in which a plurality of separate ISP image processing modules is connected.

When a plurality of devices performs ISP processing, a first device and a second device may sequentially perform ISP. Although image processing operations of the first device and the second device have the same purpose, each device may have different performance, complexity, and sophistication level. Alternatively, an ISP image processing module present in the first device may not be present in the second device.

SUMMARY

When a plurality of devices performs ISP processing on one image, ISP processing performed by a first device that performs ISP processing first may be different from that performed by a second device that performs ISP processing second, for various reasons related to the first device that performs ISP processing first. As a result, an ISP processing operation performed in the first device may be redundantly performed or an ISP processing operation that is not performed in the first device may be omitted in the second device.

According to various embodiments, when ISP processing is performed in a plurality of devices in a divided manner, information of ISP processing performed in an electronic device may be transmitted to an external electronic device that may identify the ISP processing information and perform ISP processing.

An electronic device according to various embodiments include a memory, a communication module, and a processor, in which the processor is configured to identify a raw image, to perform image processing according to a designated first image signal processing set, on the raw image, to transmit the raw image on which at least partial processing of the designated first image signal processing set is performed, to an external electronic device by using the communication module, during the performing the image processing, and to transmit information corresponding to the at least partial processing to the external electronic device such that the external electronic device skips processing corresponding to the at least partial processing among a designated second image signal processing set included in the external electronic device by using the raw image on which the at least partial processing is performed.

A method of controlling an electronic device according to various embodiments may include identifying a raw image, performing image processing according to a designated first image signal processing set by using the raw image, transmitting the raw image on which at least partial processing of the designated first image signal processing set is performed, to the external electronic device by using a communication module during execution of the image processing, and transmitting information corresponding to the at least partial processing to the external electronic device such that the external electronic device skips processing corresponding to the at least partial processing as a part of performing image processing according to a designated second image signal processing set included in the external electronic device by using the raw image on which the at least partial processing is performed.

An electronic device according to various embodiments includes a communication module and a processor, in which the processor is configured to receive a raw image on which at least partial processing of a designated first image signal processing set is performed, from the external electronic device by using the communication module, to receive information corresponding to the at least partial processing from the external electronic device, to skip processing corresponding to the at least partial processing among a designated second image signal processing set by using the raw image on which the at least partial processing is performed, based on the information corresponding to the at least partial processing, and to perform image processing by using the second image signal processing set, based on a result of the skipping.

A method of controlling an electronic device according to various embodiments may include receiving a raw image on which at least partial processing of a designated first image signal processing set is performed, from an external electronic device, receiving information corresponding to the at least partial processing from the external electronic device, skipping processing corresponding to the at least partial processing among a designated second image signal processing set by using the raw image on which the at least partial processing is performed, based on the information corresponding to the at least partial processing, and performing image processing by using the second image signal processing set, based on a result of the skipping.

According to various embodiments, when ISP processing is performed in a plurality of devices in a divided manner, information of ISP processing performed in an electronic device may be transmitted to an external electronic device, such that redundant execution or omission may be prevented when the external electronic device performs ISP processing.

BRIEF DESCRIPTION OF THE DRAWINGS

FIG. 6 is an example of processing state information of an ISP image processing module, according to various embodiments;

DETAILED DESCRIPTION

Figure 1:
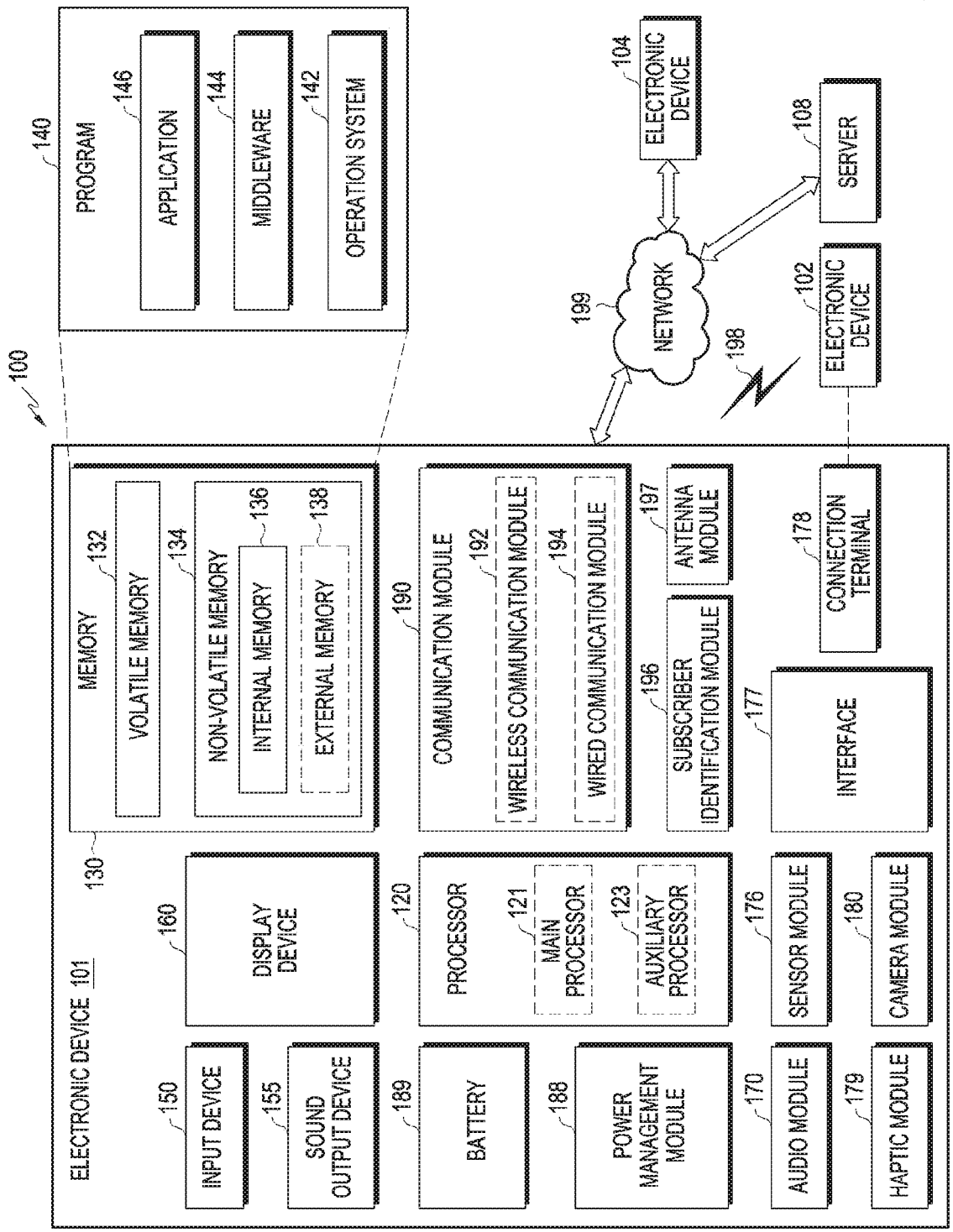
FIG. 1 illustrates a network environment including an electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a GNSS communication module) or a wired communication module 194 (e.g., an LAN communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
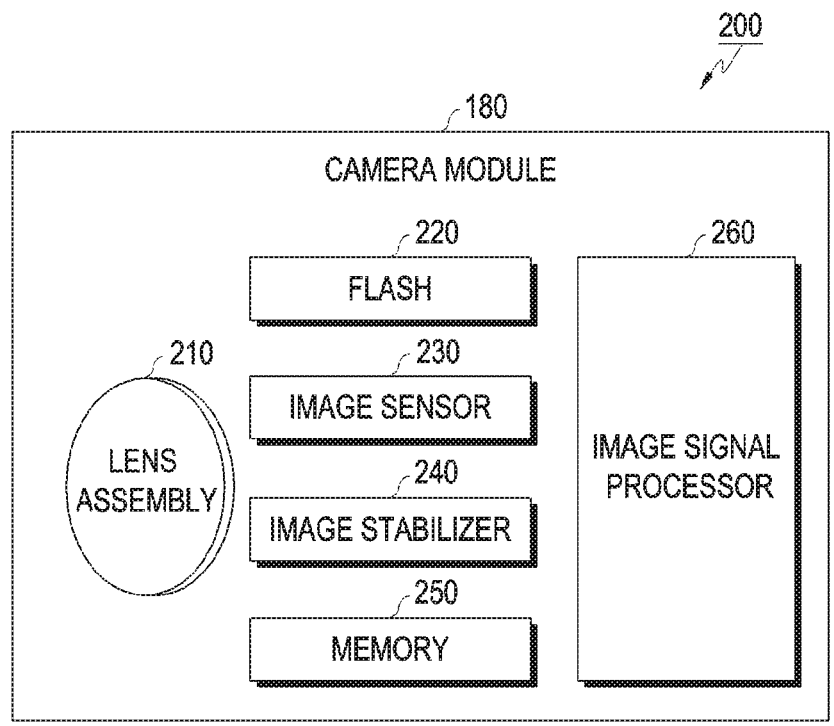
FIG. 2 is a block diagram of a camera module according to various embodiments.

FIG. 2 is a block diagram 200 of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one other lens attribute different from those of another lens assembly. The lens assembly 210 may include, for example, a wide-angle lens or a telephoto lens. The flash 220 may emit a light source that is used to reinforce light emitted from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented with, for example, a charged coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 180 or the electronic device 101 including the same upon a captured image in response to the movement. According to an embodiment, the image stabilizer 240 may be implemented with, for example, an optical image stabilizer, and may sense such a movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one another camera module may be a telescopic camera or a rear camera.

Figure 3:
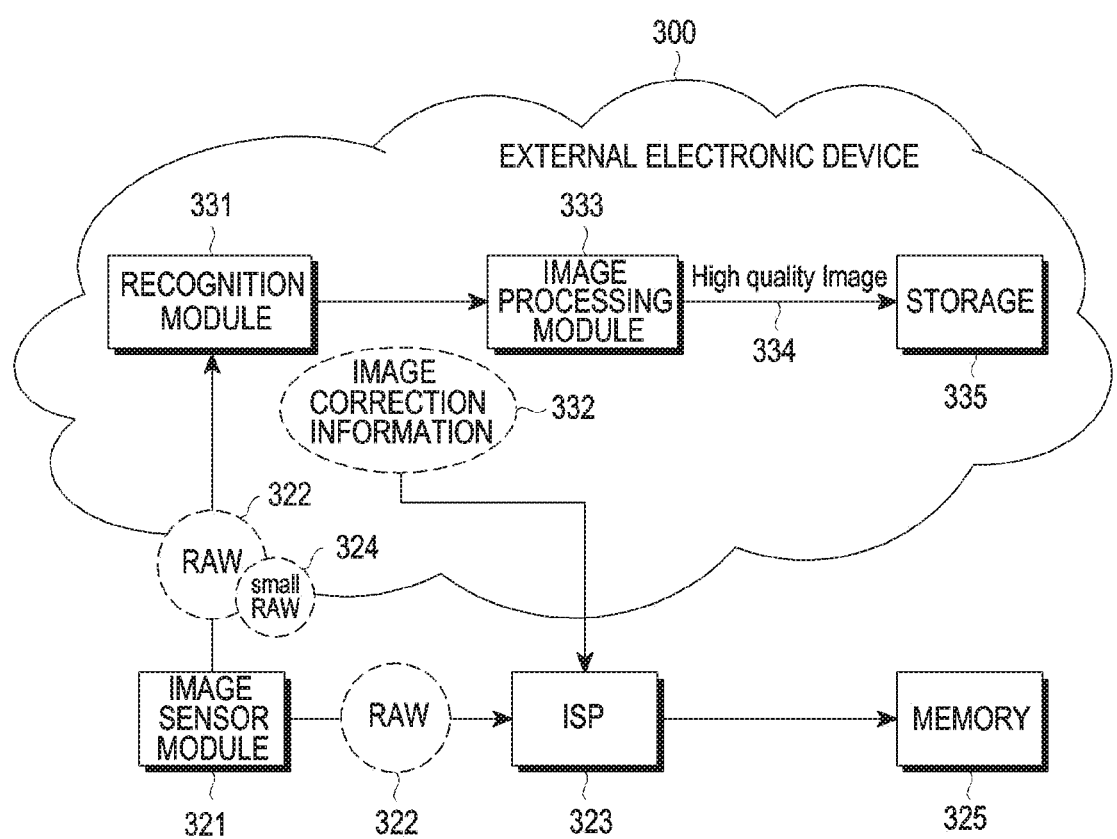
FIG. 3 is a diagram for describing operations of an electronic device and an external electronic device, according to various embodiments.

FIG. 3 is a diagram for describing operations of an electronic device and an external electronic device, according to various embodiments.

The electronic device 101 may include an image sensor 321, an image signal processor (ISP) 323, and a memory 325. The external electronic device 300 (e.g., the server 108) may include the recognition module 331, the ISP 323, and a storage 335. The recognition module 331 may be a logic module and may be implemented with a processor of the external electronic device 300. The ISP 323 may also be implemented with a processor of the external electronic device 300, and for example, a processor of the external electronic device 300 may perform both recognition and image processing. Although not shown, the electronic device 101 may include a communication module (e.g., the communication interface 170 or the communication module 220) capable of transmitting and receiving data to and from an external electronic device 300. The external electronic device 300 may include a communication module capable of transmitting and receiving data to and from the electronic device 101.

The image sensor 321 (e.g., the image sensor 230) may obtain an image regarding an external object and generate a raw image 322 (a native image) corresponding to the obtained image. The image sensor 321 may deliver the raw image 322 to the ISP 323. According to various embodiments, the image sensor 321 may generate the small raw image 324 and transmit the same to the external electronic device 300 through the communication module. According to another embodiment, the processor 327 of the electronic device 101 instead of the image sensor 321 may generate the small raw image 324 and transmit the generated small raw image 324 to the external electronic device 300 through the communication module. The image sensor 321 may transmit the raw image 322 in a compressed state to the ISP 1123 or the external electronic device 300. The image sensor 21 may compress the raw image 322 for partial processing with respect to the same and store the compressed raw image 312 in an internal memory of the image sensor 321. The recognition module 331 of the external electronic device 300 may obtain the small raw image 324 through the communication module, and segment at least one image region from the small raw image 324. The recognition module 331 may recognize each of at least one image region divided as a result of segmentation. Correction region information 332 may be generated, which includes information related to a plurality of image regions generated from the recognition module 331, e.g., coordinate information or a recognition result of an image region. The correction region information 332 may be transmitted to the electronic device 101. The ISP 323 may correct the raw image 322 by using the correction region information 332, thus generating a corrected image. The corrected image may have, for example, a format of YUV. The corrected image may be stored in the memory 325. The corrected image may be compressed according to, for example, the Joint Photographic Experts Group (JPEG) scheme, and the compressed image may be stored in the memory 325.

In various embodiments of the present disclosure, the raw image 322 provided from the image sensor 121 may be transmitted to the external electronic device 300 separately from the small raw image 324. The raw image 322 has a larger volume than the small raw image 324, such that the small raw image 324 may be first transmitted to the external electronic device 300 and then the raw image 322 may be transmitted to the external electronic device 300. For example, when the ISP 323 performs correction on the raw image 322, the raw image 322 may be transmitted to the external electronic device 300. The raw image 322 may be uploaded to the external electronic device 300 in the original form generated by the image sensor 321 or may be uploaded after being pre-processed by lens distortion compensation or noise cancellation. The pre-processing may be performed in the external electronic device 300. The external electronic device 300 may perform pre-processing for demosaic processing or image format change, or pre-processing for improving an image recognition rate. The ISP 323 of the external electronic device 300 may correct the received raw image 322. The external electronic device 300 may correct the raw image 322 by using the existing generated correction region information 332 or by using scaled correction region information. The raw image 322 may have a higher resolution than the small raw image 324, such that the ISP 323 of the external electronic device 300 may obtain detailed scaled correction region information from the high-resolution image. The ISP 323 may generate the scaled correction region information by using the existing generated correction region information and the raw image 322. The ISP 323 may obtain a high-quality image 334 by enhancing the raw image 322 using the scaled correction region information. The high-quality image 334 may be stored in the storage 335 of the external electronic device 300, and may be downloaded in the electronic device 101.

According to various embodiments, an image partially corrected in the ISP 323 may be transmitted to the external electronic device 300. In this case, the electronic device 101 may transmit information about a correction execution state, together with the image partially corrected by the ISP 323, to the external electronic device 300. The external electronic device 300 may further perform correction by using the image processing module 333 based on the received information about the correction execution state (e.g., ISP processing state information), which will be described in more detail.

Figure 4:
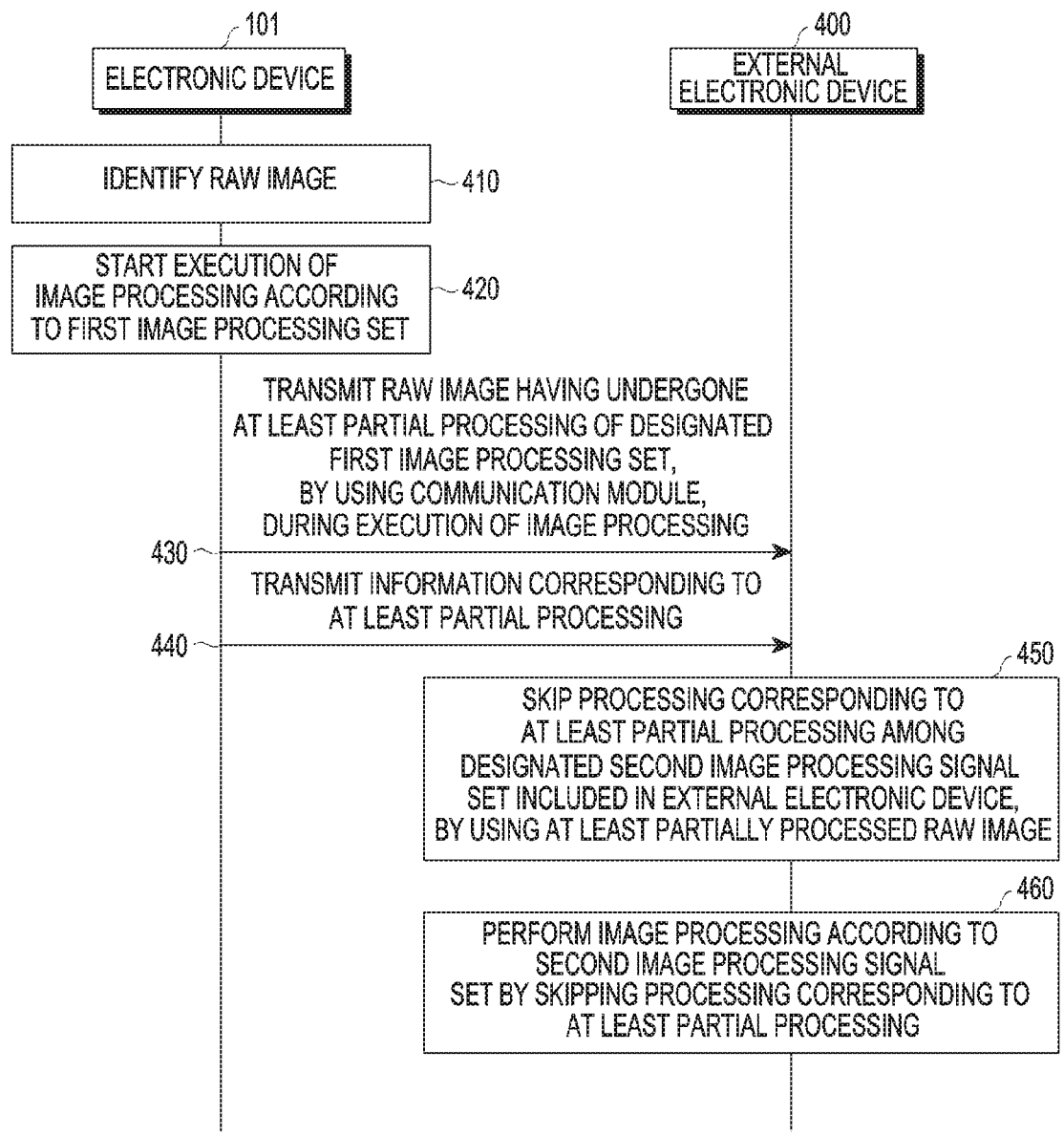
FIG. 4 is a diagram for describing operations of an electronic device and an external electronic device, according to various embodiments.
Figure 5:
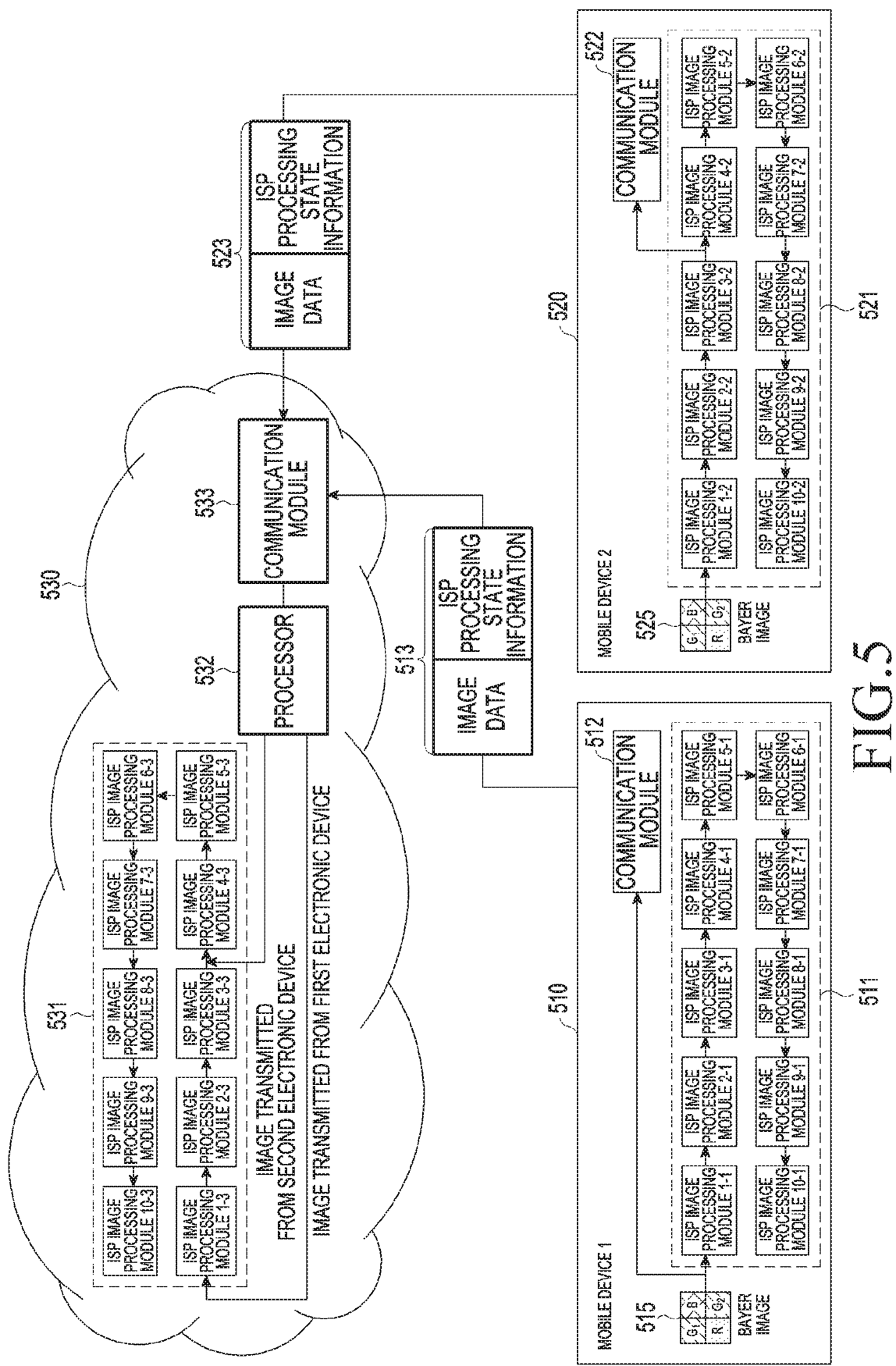
FIG. 5 is a diagram of a configuration in which an electronic device and an external electronic device perform ISP image processing, according to various embodiments.

FIG. 4 is a diagram for describing operations of an electronic device and an external electronic device, according to various embodiments. FIG. 5 is a diagram of a configuration in which an electronic device and an external electronic device perform ISP image processing, according to various embodiments.

In operation 410, the electronic device 101 (e.g., the processor 120) may identify a raw image. For example, the electronic device 101 may obtain a raw image through the camera module 180 or obtain a raw image from another electronic device through the communication module 190.

In operation 420, the electronic device 101 may start execution of image processing according to a first image processing set. Referring to FIG. 5, an electronic device 510 (e.g., the electronic device 101 of FIG. 1) may identify a raw image (a native image) 515 that is subject to image processing. The electronic device 510 and an external electronic device 520 may have a different image processing set (e.g., an image processing set 511 or an image processing set 521) depending on a type of an electronic device. According to an embodiment, the image processing set 511 may be implemented with any one of a hardware configuration or a software configuration, and as a part of the processor 120 of the electronic device 510 or a part of the ISP 323 of the external electronic device 520 (e.g., the server 108 of FIG. 1 or the external electronic device 300). The image processing set 511 may include a plurality of ISP image processing modules (e.g., ISP image processing modules 1-1 through 10-1) that are sequentially connected, and the electronic device 101 may continuously perform image processing by using the plurality of ISP image processing modules. The role and performance of an ISP image processing module included in each image processing set may differ with an electronic device. The execution order of an image processing algorithm in an image processing set may vary with a type of an electronic device.

According to an embodiment, a first electronic device 510 may start execution of image processing by using the image processing set 511. Upon start of image processing, the first electronic device 510 may start execution of image processing on the raw image 515 sequentially by using the plurality of ISP image processing modules included in the image processing set 511. The second electronic device 520 (e.g., the electronic device 104 of FIG. 1) may identify a raw image 525 that is subject to image processing. The second electronic device 520 may start execution of image processing by using the image processing set 521 included in the second electronic device 520. Upon start of image processing, the second electronic device 520 may start execution of image processing on the raw image 525 sequentially by using the plurality of ISP image processing modules included in the image processing set 521.

In operation 430, the electronic device 101 may transmit a raw image on which at least partial processing of a designated image processing set is performed, to the external electronic device 300 by using a communication module during execution of image processing. The electronic device 101 may transmit the raw image on which at least partial processing of an image processing set included in the electronic device 101 is performed, to the external electronic device 300, taking characteristics of the electronic device 101 (e.g., version information of the image processing set 511 of the electronic device 101, a power state of the electronic device 101, an environment in capturing of the raw image, user settings, etc.).

Referring to FIG. 5, the first electronic device 510 may transmit the raw image 515 to the external electronic device 530 by using a communication module 512 in a state where the first electronic device 510 does not perform image processing on the raw image 515. The second electronic device 520 may transmit the raw image to the external electronic device 530 by using a communication module 522 in a state where some 524 of the image processing set 521, e.g., ISP image processing modules 1-2, 2-2, and 3-2 have performed processing on a raw image 525 during image processing start in operation 420. Although not shown, according to another embodiment, the first electronic device 510 may transmit a raw image resulting from image processing on the raw image 515 by using the entire image processing set 511 to the external electronic device 530, by using the communication module 512. When the first electronic device 510 performs image processing on the raw image 515 by using the entire image processing set 511 and transmits the image-processed raw image to the external electronic device 530, the external electronic device 530 may skip image processing using an image processing set 531.

According to an embodiment, the first electronic device 510 may transmit the raw image 515 to the external electronic device 530 by using the communication module 512. Alternatively, when the first electronic device 510 transmits the raw image 515 to the external electronic device 530 by using the communication module 512, the first electronic device 510 may compress the raw image 515 and generate and transmit a small raw image.

In operation 440, the electronic device 101 may transmit information corresponding to at least partial processing to an external electronic device 400 (e.g., the external electronic device 300). In FIG. 4, transmission of the raw image that is subject to at least partial processing of the first image processing set and transmission of information corresponding to at least partial processing are shown as operations of two steps, but the illustration is merely an example. The electronic device 101 according to various embodiments may transmit the raw image on which at least partial processing of the first image processing set is performed and then transmit information corresponding to at least partial processing to the external electronic device 400, or may transmit the raw image on which at least partial processing of the first image processing set is performed and the information corresponding to at least partial processing to the external electronic device 400 through one communication signal. The electronic device 101 may transmit the information corresponding to at least partial processing to the external electronic device 400 such that the external electronic device 400 skips at least partial processing of an image processing set included in the external electronic device 400. Referring to FIG. 5, the first electronic device 510 may transmit image data corresponding to the raw image 515, together with information corresponding to at least partial processing. The electronic device 510 may combine the image data with information about a processing state of an ISP image processing module corresponding to the information corresponding to at least partial processing to generate first transmission data 513, and transmit the first transmission data 513 to the external electronic device 530. The external electronic device 520 may combine the raw image 525 with information about a processing state of an ISP image processing module, which is information corresponding to at least partial processing on image data corresponding to a raw image image-processed by some 524 of the image processing set 521, as header information to generate second transmission data 523, and transmit the second transmission data 523 to the external electronic device 530.

FIG. 6 is an example of processing state information of an ISP image processing module, according to various embodiments. According to various embodiments, processing state information of an ISP image processing module may include at least one of device information or processing state information. The device information may include model information of the electronic device (e.g., the electronic device 101 of FIG. 1), version information of an image processing set included in the electronic device, version information of each of a plurality of ISP image processing modules included in the image processing set of the electronic device, lens characteristic information included in the electronic device, and sensor model information included in the electronic device. Depending on the above-described information, a way to process a raw image and which ISP image processing module among the plurality of ISP image processing modules included in the image processing set is to be used for image processing by the electronic device may differ. The processing state information may include information about whether each ISP image processing module included in the image processing set of the electronic device performs processing. For example, in FIG. 6, when the electronic device transmits a raw image to the external electronic device 530 by performing image processing by using ISP image processing modules 1, 2, and 3 and performing image processing without using ISP image processing modules 4, 5, and 6, the electronic device may store information indicating whether each ISP image processing module is to perform image processing in processing state information of the ISP image processing module.

In operation 450, the external electronic device 400 may skip processing corresponding to at least partial processing as a part of image processing according to a designated image signal processing set included in the external electronic device by using the at least partially processed raw image. The external electronic device 400 may determine a process to be skipped, based on the received information corresponding to at least partial processing. In operation 460, the electronic device 400 may perform image processing according to an image signal processing set included in the external electronic device 400 by excluding processing corresponding to at least partial processing. For example, the external electronic device 400 may skip image processing corresponding to at least partial processing performed in the electronic device 101 to avoid redundant execution of the image processing.

Referring to FIG. 5, the external electronic device 530 may divide the first transmission data 513 received using the communication module 533 into image data and processing state information of an ISP image processing module. When the image data is compressed and transmitted in the first electronic device 510, the processor 532 of the external electronic device 533 may decode the image data by using a decoder having a compression algorithm used for compression in the first electronic device 510.

According to an embodiment, the processor 532 of the external electronic device 530 may determine an ISP image processing module that is to perform image processing and an ISP image processing module that is not to perform image processing among the plurality of ISP image processing modules included in the image processing set 531, based on the information corresponding to at least partial processing. For example, the processor 532 may determine based on the information corresponding to at least partial processing received from the first electronic device 510 that image processing is not performed in the first electronic device 510. The processor 532 may input the raw image received from the first electronic device 510 to the ISP image processing modules 1 through 3 and sequentially start execution of image processing, thus performing image processing by using all of the plurality of ISP image processing modules included in the image processing set 531 included in the external electronic device 530. The external electronic device 530 may transmit an image-processed image to the first electronic device 510 by using the communication module 533.

According to an embodiment, the processor 532 may determine based on the information corresponding to at least partial processing received from the second electronic device 520 that image processing is performed using a part of the image processing set in the second electronic device 520. The processor 532 may determine that image processing has been performed on the raw image 525 by using the ISP image processing modules 1-2, 2-2, and 3-2 in the second electronic device 520. The processor 532 may skip image processing using ISP image processing modules 1-3, 2-3, and 3-3 to avoid redundant image processing because the ISP image processing modules 1-2, 2-2, and 3-2 are the same as the ISP image processing modules 1-3, 2-3, and 3-3 included in the external electronic device 530. The processor 532 may input the raw image received from second electronic device 520 to an ISP image processing module 4-3 and sequentially start execution of image processing. The processor 532 may perform image processing by using a plurality of ISP image processing modules included in the image processing set 531 included in the external electronic device 530, except for the ISP image processing modules 1-3, 2-3, and 3-3. The external electronic device 530 may transmit an image-processed image to the second electronic device 520 by using the communication module 533.

Figure 7:
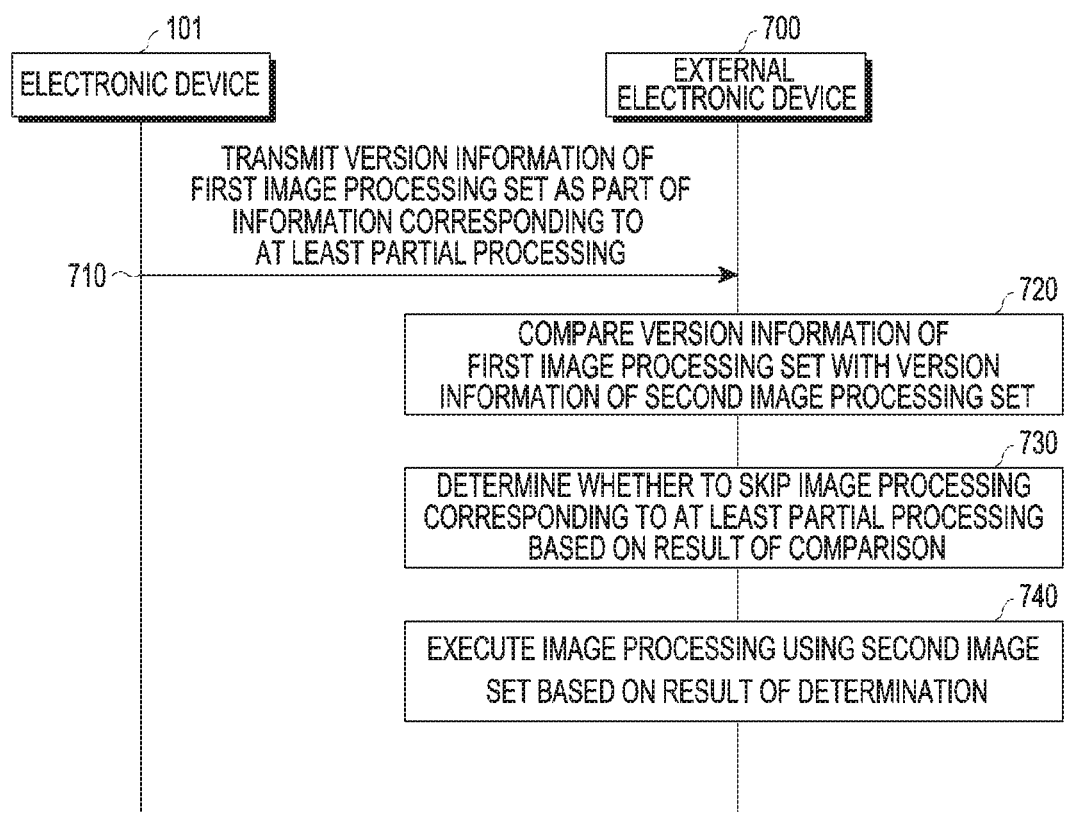
FIG. 7 is a diagram for describing operations of an electronic device and an external electronic device, according to various embodiments.
Figure 8:
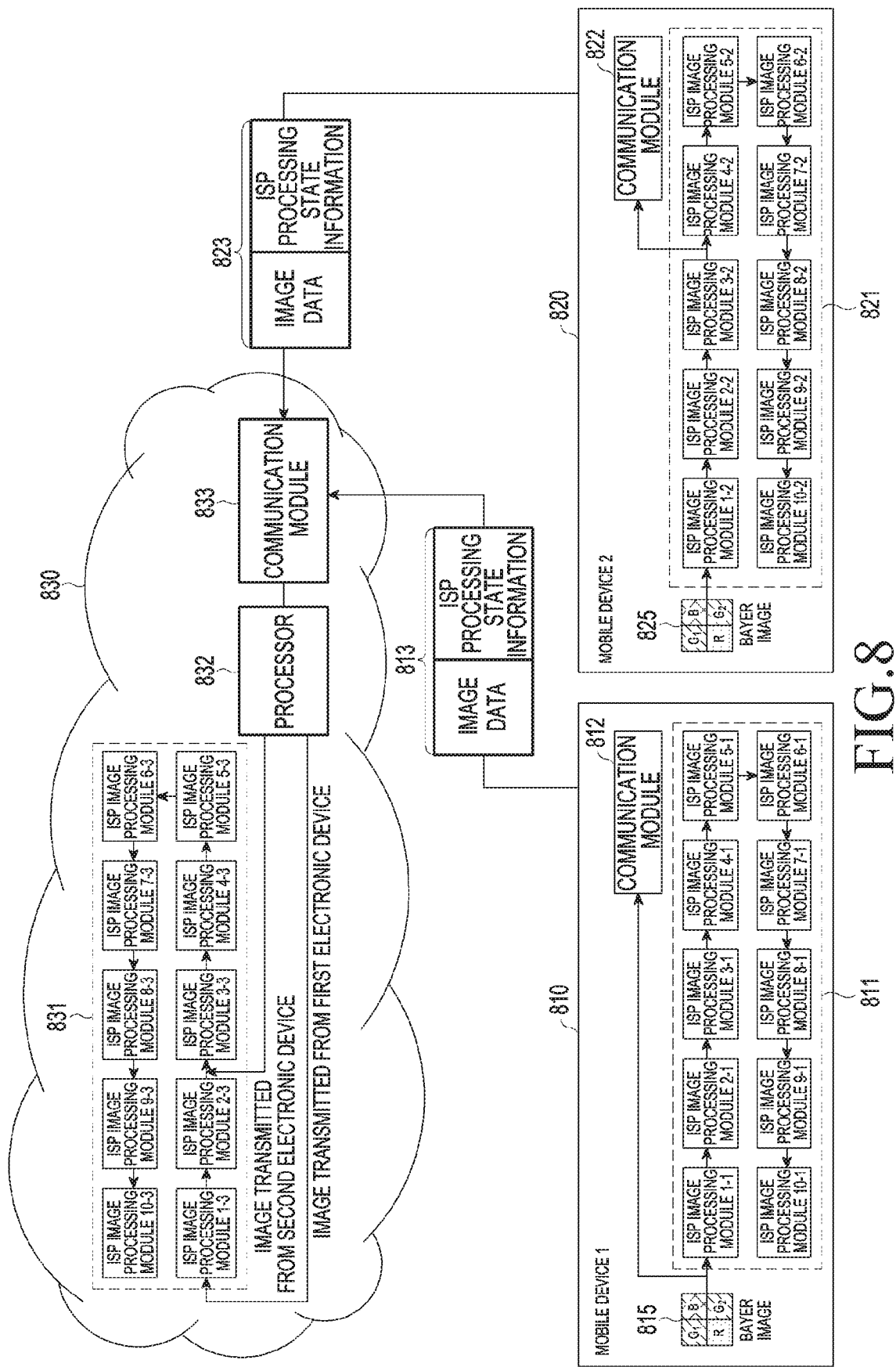
FIG. 8 is a diagram of a configuration in which an electronic device and an external electronic device perform ISP image processing, according to various embodiments.

FIG. 7 is a diagram for describing operations of an electronic device and an external electronic device, according to various embodiments. FIG. 8 is a diagram of a configuration in which an electronic device and an external electronic device perform ISP image processing, according to various embodiments.

In operation 710, the electronic device 101 (e.g., the processor 120) may transmit version information of a first image processing set as a part of information corresponding to at least partial processing to an external electronic device 700 (e.g., the external electronic device 300 of FIG. 3, the external electronic device 400 of FIG. 4, or the ISP 323 of FIG. 3). For example, the electronic device 101 may transmit version information of an image processing set included in the electronic device 101 and version information of a plurality of ISP image processing modules included in the image processing set to the external electronic device 700 through the information corresponding to the at least partial processing described with reference to FIG. 4. Alternatively, the electronic device 101 may transmit version information of an ISP image processing corresponding to at least partial processing to the external electronic device 700 through the information corresponding to the at least partial processing.

Referring to FIG. 8, a first electronic device 810 (e.g., the electronic device 101 or the processor 120 of FIG. 1 or the electronic device 101 of FIG. 4) may transmit version information of an image processing set 811 included in the first electronic device 810 and version information of each of a plurality of ISP image processing modules included in the image processing set 811 to an external electronic device 830 (e.g., the server 108) through first transmission data 813. A second electronic device 820 (e.g., the electronic device 104 of FIG. 1) may transmit version information of an image processing set 821 included in the second electronic device 820 and version information of each of a plurality of ISP image processing modules included in the image processing set 821 to the external electronic device 830 through second transmission data 823.

In operation 720, the electronic device 700 may compare the version information of the first image processing set with the version information of the second image processing set included in the external electronic device 700. For example, the external electronic device 700 may compare the version information of the first image processing set included in the electronic device 101 with the version information of the second image processing set, and compare version information of a plurality of ISP image processing modules included in the first image processing set with version information of a plurality of ISP image processing modules included in the second image processing set. In operation 730, the external electronic device 700 may determine whether to skip processing corresponding to at least partial processing based on a result of the comparison. In operation 740, the external electronic device 700 may perform image processing by using the second image processing set, based on a result of the determination. The external electronic device 700 may determine whether to skip processing corresponding to at least partial processing performed in the electronic device 101 based on the result of the determination to perform image processing based on a result of the determination.

According to an embodiment, referring to FIG. 8, an external electronic device 830 (e.g., the server 108 of FIG. 1, the external electronic device 300 of FIG. 3, the external electronic device 400 of FIG. 4, or the external electronic device 530 of FIG. 5) may receive information regarding at least partial processing corresponding to the raw image 815 from the first electronic device 810 (e.g., the electronic device 101 of FIG. 1, the electronic device 101 of FIG. 4, or the electronic device 510 of FIG. 5) through a communication module 833. The processor 832 of the external electronic device 830 may receive the information corresponding to the at least partial processing from the communication module 833. The processor 832 may compare version information of the plurality of ISP image processing modules included in the image processing set 811 with version information of a plurality of ISP image processing modules included in an image processing set 831, based on the information corresponding to the at least partial processing. The processor 832 may determine based on the information corresponding to at least partial processing that image processing is not performed in the first electronic device 810. The processor 832 may perform image processing on the raw image received from the first electronic device 810 by using the image processing set 831.

According to an embodiment, an external electronic device 830 may receive information regarding at least partial processing corresponding to the raw image 825 from the first electronic device 820 (e.g., the electronic device 104 of FIG. 2, the electronic device 101 of FIG. 4, or the electronic device 510 of FIG. 5) through the communication module 833. The processor 832 of the external electronic device 830 may receive information 813 corresponding to the at least partial processing from the communication module 833. The processor 832 may compare version information of the plurality of ISP image processing modules included in the image processing set 821 with version information of a plurality of ISP image processing modules included in an image processing set 831, based on the information corresponding to the at least partial processing. The processor 832 may determine based on information 823 corresponding to at least partial processing that image processing has been performed by using the ISP image processing modules 1-2, 2-2, and 3-2 in the second electronic device 820. The processor 832 may compare the version information of the image processing modules 1-2, 2-2, and 3-2 with the version information of the image processing modules 1-3, 2-3, and 3-3.

According to an embodiment, even when image processing is performed by some ISP image processing modules included in the image processing set 821 of the second electronic device 820, in case that some ISP image processing modules included in the image processing set 831 have higher versions, the processor 832 may perform image processing by using an ISP image processing module having a higher version among the some ISP image processing modules included in in the image processing set 831. For example, the versions of the ISP image processing modules 1-2 and 2-2 are the same as those of the ISP image processing modules 1-3 and 2-3 and the version of the ISP image processing module 2-3 is higher than that of the ISP image processing module 3-3, the processor 832 may not perform image processing using the ISP image processing modules 1-3, 2-3, and 3-3. In another example, the versions of the ISP image processing modules 1-2 and 2-2 are the same as those of the ISP image processing modules 1-3 and 2-3 and the version of the ISP image processing module 2-3 is lower than that of the ISP image processing module 3-3, the processor 832 may input a raw image received from the second electronic device to the ISP image processing module 3-3 and perform image processing such that image processing is performed sequentially from the ISP image processing module 3-3.

Figure 9:
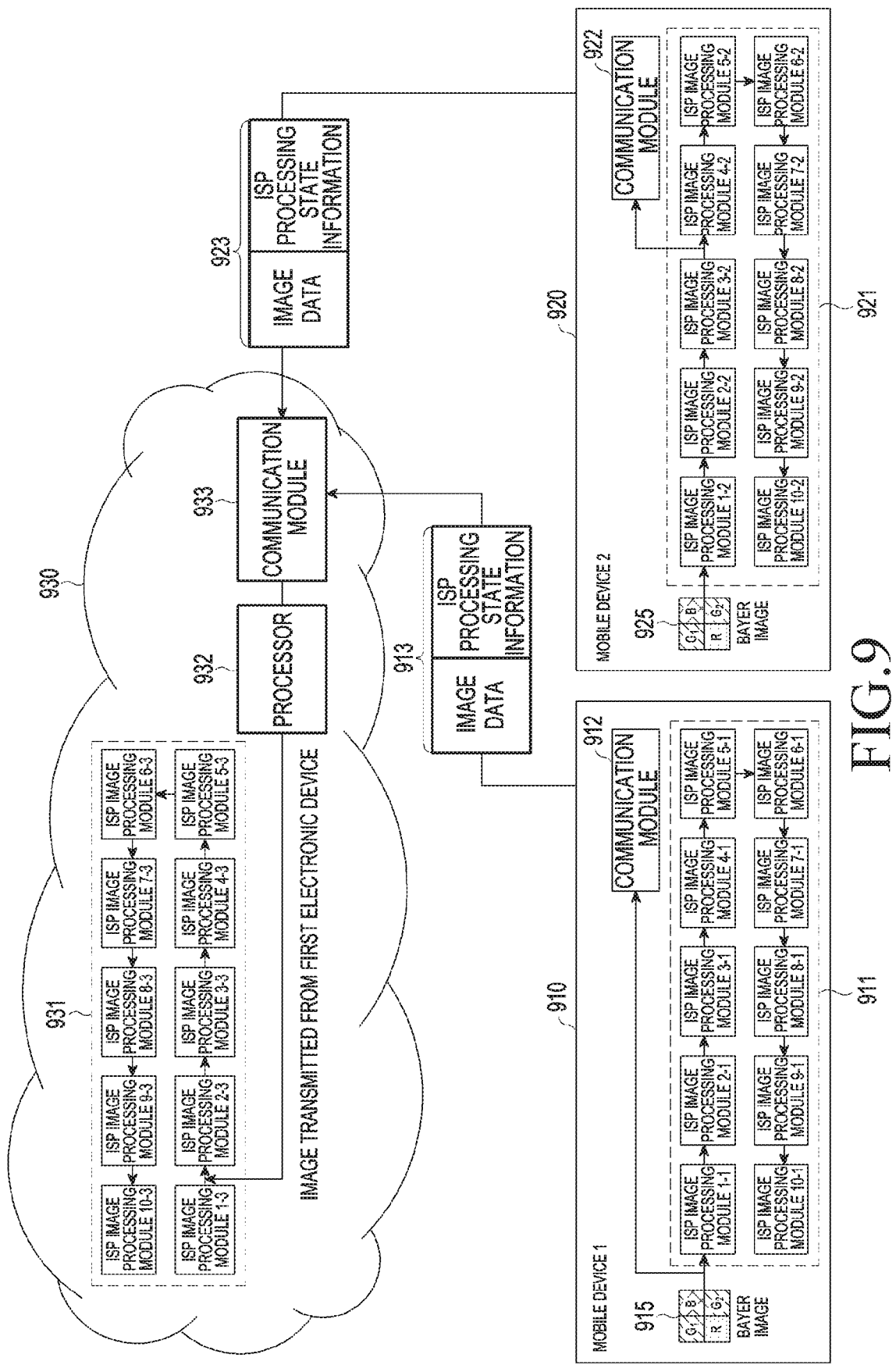
FIG. 9 is a diagram of a configuration in which an electronic device and an external electronic device perform ISP image processing, according to various embodiments.

FIG. 9 is a diagram of a configuration in which an electronic device and an external electronic device perform ISP image processing, according to various embodiments.

Referring to FIG. 9, an image processing set 931 of an external electronic device 930 (e.g., the server 108 of FIG. 1, the external electronic device 300 or the ISP 323 of FIG. 3, the external electronic device 400 of FIG. 4, or the external electronic device 530 of FIG. 5) may include an ISP image processing module that is not included in an image processing set 911 of the first electronic device (e.g., the electronic device 101 of FIG. 1, the processor 120 of FIG. 1, the electronic device 101 of FIG. 4, or the electronic device 510 of FIG. 5). For example, the image processing set 931 may include the ISP image processing module 2-3 and the ISP image processing module 3-3 that are not included in the image processing set 911. The external electronic device 930 may receive a raw image on which at least partial processing of the ISP image processing module 1-1 is performed and information 913 corresponding to the at least partial processing, from a first electronic device 910 (e.g., the electronic device 101 of FIG. 1). The external electronic device 930 may determine that the raw image has undergone image processing of the ISP image processing module 1-1, based on the at least partially processed raw image and the information 913 corresponding to the at least partial processing. The external electronic device 930 may input the raw image to the ISP image processing module 2-3 and perform image processing sequentially, such that the received raw image is image-processed by the ISP image processing module 2-3 and the ISP image processing module 3-3 that are not included in the image processing set 911. The external electronic device 930 may perform image processing on the raw image by using the image processing set 931 and transmit the image-processed image to the first electronic device 910 by using a communication module 933.

An electronic device (e.g., the electronic device 101 of FIG. 1) according to various embodiments may include a memory (e.g., the memory 130 of FIG. 1), a communication module (e.g., the communication module 190 of FIG. 1), and a processor (e.g., the processor 120 of FIG. 1), in which the processor 120 is configured to identify a raw image, to perform image processing according to a designated first image signal processing set, on the raw image, to transmit the raw image on which at least partial processing of the designated first image signal processing set is performed, to an external electronic device (e.g., the external electronic device 300 of FIG. 3) by using the communication module 190 during the performing image processing, and to transmit information corresponding to the at least partial processing to the external electronic device 300 such that the external electronic device 300 skips processing corresponding to the at least partial processing among a designated second image signal processing set included in the external electronic device 300 by using the raw image on which the at least partial processing is performed.

In the electronic device 101 according to an embodiment, the processor 120 may be configured to transmit version information regarding at least a part of the first image signal processing set corresponding to the at least partial processing to the external electronic device 300 as a part of the information corresponding to the at least partial processing such that the external electronic device 300 determines whether to skip processing, based on the version information. According to an embodiment, the processor 120 may be configured to receive an image for which image processing is skipped by a first image processing module, which is included in at least a part of the first image signal processing set, from the external electronic device, when a version of a first image processing module is higher than a version of a second image processing module included in at least a part of the external electronic device, and to receive an image for which image processing is performed by the first image processing module, which is included in at least a part of the first image signal processing set, from the external electronic device, when the version of the first image processing module is lower than the version of the second image processing module included in at least a part of the external electronic device. According to an embodiment, the processor 120 may be configured to receive, using the communication module, a corrected image obtained by the external electronic device 300 performing image processing on the raw image by using the second image signal processing set. According to an embodiment, the information corresponding to the at least partial processing may include information regarding whether image processing is performed by at least a part of the designated first image signal processing set and at least one of device model information of the electronic device, lens characteristic information of the electronic device, or sensor model information of the electronic device. According to an embodiment, the processor 120 may be configured to receive an image on which image processing of the first image processing module, which is included in the designated second image signal processing set included in the external electronic device 300, is performed, from the external electronic device 300, when the first image processing module is not included in the first image signal processing set.

A method of controlling the electronic device 101 according to various embodiments may include identifying a raw image, performing image processing according to a designated first image signal processing set by using the raw image, transmitting the raw image on which at least partial processing of the designated first image signal processing set is performed, to the external electronic device 300 by using the communication module 190 during execution of image processing, and transmitting information corresponding to the at least partial processing to the external electronic device 300 such that the external electronic device 300 skips processing corresponding to the at least partial processing as a part of performing image processing according to a designated second image signal processing set included in the external electronic device 300 by using the raw image on which the at least partial processing is performed.

According to an embodiment, the method may further include transmitting version information regarding at least a part of the first image signal processing set corresponding to the at least partial processing to the external electronic device as a part of the information corresponding to the at least partial processing to determine whether to skip processing, based on the version information.

According to an embodiment, the method may further include receiving an image for which image processing is skipped by the first image processing module from the external electronic device, when a version of a first image processing module included in at least a part of the first image signal processing set is higher than a version of a second image processing module included in at least a part of the external electronic device, and receiving an image for which image processing is performed by the first image processing module, which is included in at least a part of the first image signal processing set, from the external electronic device, when the version of the first image processing module is lower than the version of the second image processing module included in at least a part of the external electronic device.

According to an embodiment, the method may further include receiving a corrected image obtained by the external electronic device 300 performing image processing on the raw image by using the second image signal processing set. According to an embodiment, the information corresponding to the at least partial processing may include information regarding whether image processing is performed by at least a part of the designated first image signal processing set and device model information of the electronic device 101, lens characteristic information of the electronic device, or sensor model information of the electronic device. According to an embodiment, the method may further include receiving an image on which image processing of the first image processing module, which is included in the designated second image signal processing set included in the external electronic device 300, is performed, from the external electronic device 300, when the first image processing module is not included in the first image signal processing set.

The electronic device 101 according to various embodiments may include the communication module 190 and the processor 120, in which the processor 120 is configured to receive a raw image on which at least partial processing of a designated first image signal processing set is performed, from the external electronic device 300 by using the communication module 190, to receive information corresponding to the at least partial processing from the external electronic device 300, to skip processing corresponding to the at least partial processing among a designated second image signal processing set by using the raw image on which the at least partial processing is performed, based on the information corresponding to the at least partial processing, and to perform image processing by using the second image signal processing set, based on a result of the skipping.

According to an embodiment, the processor 120 may be further configured to receive version information regarding at least a part of the first image signal processing set corresponding to the at least partial processing and to determine based on the version information whether to perform processing corresponding to the at least partial processing, as a part of performing image processing according to the designated second image signal processing set by using the raw image on which the at least partial processing is performed.

According to an embodiment, the processor 120 may be further configured to compare version information regarding at least a part of the first image signal processing set corresponding to the at least partial processing with version information regarding the designated second image signal processing set to determine whether to perform processing corresponding to the at least partial processing. According to an embodiment, the processor 120 may be further configured to, when a version of at least a part of the first image signal processing set corresponding to the at least partial processing is higher than a version of at least a part of the designated second image signal processing set, skip image processing using at least the part of the second image signal processing set. According to an embodiment, the processor 120 may be further configured to, when a version of at least a part of the first image signal processing set corresponding to the at least partial processing is lower than a version of at least a part of the designated second image signal processing set, perform image processing on the raw image by performing image processing using at least the part of the second image signal processing set. According to an embodiment, the processor 120 may be configured to transmit to the external electronic device 300, using the communication module 190, a second image corrected by performing image processing on the raw image using the second image signal processing set. According to an embodiment, the information corresponding to the at least partial processing may include information regarding whether image processing is performed by at least a part of the designated first image signal processing set and at least one of device model information of the external electronic device 300, lens characteristic information of the external electronic device 300, or sensor model information of the external electronic device 300. According to an embodiment, the processor 120 may be configured to perform image processing by using a first image processing module, when the first image processing module included in the second image signal processing set is not included in the first image signal processing set and transmit an image on which image processing is performed to the external electronic device 300.

A method of controlling an electronic device according to various embodiments may include receiving a raw image on which at least partial processing of a designated first image signal processing set is performed, from an external electronic device, receiving information corresponding to the at least partial processing from the external electronic device, skipping processing corresponding to the at least partial processing among a designated second image signal processing set by using the raw image on which the at least partial processing is performed, based on the information corresponding to the at least partial processing, and performing image processing by using the second image signal processing set, based on a result of the skipping.

According to an embodiment, the method may further include receiving version information regarding at least a part of the first image signal processing set corresponding to the at least partial processing and determining based on the version information whether to perform processing corresponding to the at least partial processing, as a part of performing image processing according to the designated second image signal processing set by using the raw image on which the at least partial processing is performed.

According to an embodiment, the method may further include comparing version information regarding at least a part of the first image signal processing set corresponding to the at least partial processing with version information regarding the designated second image signal processing set to determine whether to perform processing corresponding to the at least partial processing. According to an embodiment, the method may further include, when a version of at least a part of the first image signal processing set corresponding to the at least partial processing is higher than a version of at least a part of the designated second image signal processing set, skipping image processing using at least the part of the second image signal processing set. According to an embodiment, the method may further include, when a version of at least a part of the first image signal processing set corresponding to the at least partial processing is lower than a version of at least a part of the designated second image signal processing set, performing image processing on the raw image by performing image processing using at least the part of the second image signal processing set. According to an embodiment, the method may further include transmitting to the external electronic device, using the communication module, a second image corrected by performing image processing on the raw image using the second image signal processing set. According to an embodiment, the information corresponding to the at least partial processing may include information regarding whether image processing is performed by at least a part of the designated first image signal processing set and at least one of device model information of the external electronic device, lens characteristic information of the external electronic device, or sensor model information of the external electronic device. According to an embodiment, the method may further include performing image processing by using a first image processing module, when the first image processing module included in the second image signal processing set is not included in the first image signal processing set and transmit an image on which image processing is performed to the external electronic device.

An electronic device according to various embodiments may be one of various types of electronic devices, according to various embodiments of the present disclosure. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), functions corresponding to the instructions may be performed directly by the processor or using other components under control of the processor. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a memory;
a communication module; and
a processor,
wherein the processor is configured to:
identify a raw image;
perform image processing according to a designated first image signal processing set, on the raw image;
transmit the raw image on which at least partial processing of the designated first image signal processing set is performed, to an external electronic device by using the communication module, during the performing the image processing; and
transmit information corresponding to the at least partial processing to the external electronic device such that the external electronic device skips processing corresponding to the at least partial processing among a designated second image signal processing set included in the external electronic device by using the raw image on which the at least partial processing is performed.

2. The electronic device of claim 1, wherein the processor is configured to transmit version information regarding at least a part of the first image signal processing set corresponding to the at least partial processing to the external electronic device as a part of the information corresponding to the at least partial processing such that the external electronic device determines whether to skip processing, based on the version information.

3. The electronic device of claim 2, wherein the processor is configured to:
receive an image for which image processing is skipped by a first image processing module, which is included in at least a part of the first image signal processing set, from the external electronic device, when a version of the first image processing module is higher than a version of a second image processing module included in at least a part of the external electronic device; and receive an image for which image processing is performed by the first image processing module, which is included in at least a part of the first image signal processing set, from the external electronic device, when the version of the first image processing module is lower than the version of the second image processing module included in at least a part of the external electronic device.

4. The electronic device of claim 1, wherein the processor is configured to receive, using the communication module, a corrected image obtained by the external electronic device performing image processing on the raw image by using the second image signal processing set.

5. The electronic device of claim 1, wherein the information corresponding to the at least partial processing comprises information regarding whether image processing is performed by at least a part of the designated first image signal processing set and at least one of device model information of the electronic device, lens characteristic information of the electronic device, or sensor model information of the electronic device.

6. The electronic device of claim 1, wherein the processor is configured to receive an image on which image processing is performed by a first image processing module included in the designated second image signal processing set included in the external electronic device, from the external electronic device, when the first image processing module is not included in the first image signal processing set.

7. An electronic device comprising:
a communication module; and
a processor,
wherein the processor is configured to:
receive a raw image on which at least partial processing of a designated first image signal processing set is performed, from an external electronic device by using the communication module;
receive information corresponding to the at least partial processing from the external electronic device;
skip processing corresponding to the at least partial processing among a designated second image signal processing set, by using the raw image on which the at least partial processing is performed, based on the information corresponding to the at least partial processing; and
perform image processing by using the second image signal processing set, based on a result of the skipping.

8. The electronic device of claim 7, wherein the processor is configured to:
receive version information regarding at least a part of the first image signal processing set corresponding to the at least partial processing; and
determine, based on the version information, whether to perform processing corresponding to the at least partial processing, as a part of performing image processing according to the designated second image signal processing set, by using the raw image on which the at least partial processing is performed.

9. The electronic device of claim 7, wherein the processor is configured to compare version information regarding at least a part of the first image signal processing set corresponding to the at least partial processing with version information regarding the designated second image signal processing set to determine whether to perform processing corresponding to the at least partial processing.

10. The electronic device of claim 7, wherein the processor is configured to, when a version of at least a part of the first image signal processing set corresponding to the at least partial processing is higher than a version of at least a part of the designated second image signal processing set, skip image processing using at least the part of the second image signal processing set.

11. The electronic device of claim 7, wherein the processor is configured to, when a version of at least a part of the first image signal processing set corresponding to the at least partial processing is lower than a version of at least a part of the designated second image signal processing set, perform image processing on the raw image by performing image processing using at least the part of the second image signal processing set.

12. The electronic device of claim 7, wherein the processor is configured to transmit to the external electronic device, using the communication module, a second image corrected by performing image processing on the raw image using the second image signal processing set.

13. The electronic device of claim 7, wherein the information corresponding to the at least partial processing comprises information regarding whether image processing is performed by at least a part of the designated first image signal processing set and at least one of device model information of the external electronic device, lens characteristic information of the external electronic device, or sensor model information of the external electronic device.

14. The electronic device of claim 7, wherein the processor is configured to:
perform image processing by using a first image processing module, when the first image processing module included in the second image signal processing set is not included in the first image signal processing set; and
transmit an image on which image processing is performed to the external electronic device.

* * * * *